United States Patent [19]

Trautmann et al.

[11] Patent Number: 5,776,224
[45] Date of Patent: Jul. 7, 1998

[54] THICKENED SOIL STABILIZER, AND A PACKAGED READY MIX COMPRISING IT

[75] Inventors: André Trautmann, Essen; Stephan Bloemer, Düsseldorf; Egbert Hausberg, Schermbeck, all of Germany

[73] Assignee: Huels Aktiengesellschaft, Marl, Germany

[21] Appl. No.: 622,284

[22] Filed: Mar. 25, 1996

[30] Foreign Application Priority Data

Mar. 25, 1995 [DE] Germany .................. 195 10 957.0

[51] Int. Cl.$^6$ .................. B65D 81/24; C05D 9/00
[52] U.S. Cl. .................. 71/1; 71/903; 71/904; 71/DIG. 1; 106/823; 106/900; 206/205
[58] Field of Search .................. 71/1, 903, 904, 71/DIG. 1; 106/823, 900; 206/205

[56] References Cited

U.S. PATENT DOCUMENTS

| | | |
|---|---|---|
| 4,961,790 | 10/1990 | Smith et al. .................. 106/823 |
| 5,108,807 | 4/1992 | Tucker . |
| 5,224,595 | 7/1993 | Sugimoto et al. .................. 106/823 |
| 5,330,047 | 7/1994 | Gouge et al. .................. 206/205 |
| 5,436,218 | 7/1995 | Hausberg .................. 71/903 |

FOREIGN PATENT DOCUMENTS

| | | |
|---|---|---|
| 0 072 214 | 2/1983 | European Pat. Off. . |
| 0 093 678 | 11/1983 | European Pat. Off. . |
| WO 92/01377 | 2/1992 | WIPO . |
| WO 93/22215 | 11/1993 | WIPO . |
| WO 94 29188 | 12/1994 | WIPO . |

*Primary Examiner*—Wayne Langel
*Attorney, Agent, or Firm*—Oblon, Spivak, McClelland, Maier & Neustadt, P.C.

[57] ABSTRACT

The invention is a packaged ready mix, having a biodegradable external packaging, an oil-resistant degradable internal liner, and a thickened soil stabilizer surrounded by said internal liner. The external packaging is made from a material which decomposes in water. The thickened soil stabilizer contains a carrier and an organic binder. The packaged ready mix can be applied to soil without the need to remove, or dispose of, any packaging material.

11 Claims, No Drawings

1

THICKENED SOIL STABILIZER, AND A PACKAGED READY MIX COMPRISING IT

BACKGROUND OF THE INVENTION

1. Field of the Invention

This invention relates to A packaged ready mix for treating soil, a thickened soil stabilizer, and a method of applying the thickened soil stabilizer using the packaged ready mix.

2. Discussion of the Background

Soil treatment methods, for example, the greening of fallow or waste land (waste dumps, industrial fallow land), are well known. One example is the hydroseeding method of DIN 18 918. In this method a mixing tank of a specific vehicle (the hydroseeder) is charged at the site with each individual component required for hydroseeding. Each component is dispensed from commercially available containers, and the components are mixed with water to give a homogeneous mixture. The resulting mixture is then sprayed on the area to be stabilized or greened. The components are mixed on site because the soil stabilizer must be stored in special barrels, with the exclusion of air, to avoid untimely binding of the soil stabilizer.

A disadvantage of the hydroseeding method is the necessity to dispose of the packaging materials and barrels from which each component of the mixture is dispensed. Another disadvantage is the considerable labor and expense needed to mix the various components in the proper proportions, taking into consideration the amount required per unit area.

SUMMARY OF THE INVENTION

Accordingly, one object of this invention is to avoid the need to dispose of containers.

Another object of the invention is to provide a packaged ready mix of a soil stabilizer, avoiding the need to measure and mix components before use.

Still another object of the invention is to provide a novel thickened soil stabilizer.

The objects of this invention are provided by a packaged ready mix for soil treatment. The ready mix has a two-part container:

(a) a biodegradable external packaging which decomposes in water; and (b) at least one oil-resistant, degradable, internal liner, having one or more layers.

The internal liner holds a thickened soil stabilizer containing at least one organic binder, and at least one organic and/or inorganic carrier.

The packaged ready mix of this invention can be introduced directly into a hydroseeder mixing tank without removing or disposing of any packaging or barrels. During the mixing process in the mixing tank, in the presence of water, the external packaging and the internal liner are softened or dissolved and mechanically comminuted. The mixture so prepared can be applied directly to the soil. The soil stabilizer of this invention can be stored without exposing it to air.

DETAILED DESCRIPTION OF THE INVENTION

The thickened soil stabilizer of this invention is composed of organic binders and organic and/or inorganic carriers, having 1 to 20 parts by weight, preferably 5 to 15 parts by weight, of carrier per 100 parts by weight of organic binder.

The soil stabilizer is preferably employed in thickened form. Examples of carriers include cellulose, jute or coconut fibers, cotton, wood particles, shredded paper, fur, horn meal, bone particles, straw, organic fertilizer, compost, rock meal, clay minerals, brick grit, brick dust, demolition materials and foamed glass.

Organic binders for use in the present invention are well known to those of ordinary skill in the art. Examples include liquid polymers, such as liquid polybutadiene oil. Some are commercially available, as described in Elastomers, *Liquid Systems and Their Mixed Properties*, 2nd ed. Cordura Publications, Inc., pp. 81–85 (1980). The preferred liquid polybutadiene oil is TERRAVEST®K (HÜLS). Liquid polybutadiene oils are described in more detail in U.S. Pat. No. 5,436,218, hereby incorporated by reference. This reference also describes other suitable binders. An example is CURASOL® (HOECHST) an aqueous plastic dispersion based on vinyl acetate. Other binders are also described in RÖMPP Chemie Lexikon (9th ed., pages 468 and 813).

The external packaging of the ready mix is composed of a material which decomposes in water and is degradable. Examples include cellulose, paper and/or board. These external packaging materials are well know to those of ordinary skill in the art. The external packaging can contain other organic and/or inorganic substrates, such as seed, fertilizer, plants or plant parts, substrates which absorb and store fluids, pH regulators, organic fibers such as cellulose, wood, jute or coconut fibers, straw and peat, as well as other auxiliaries and additives.

The internal liner of the packaged ready mix can be composed of one or more layers. The inner liner must not be softened by the thickened soil stabilizer which it contains, and therefore must be resistant to oil. It is also necessary for the internal liner to be degradable under normal environmental conditions, such as degradation by organisms and UV radiation. Examples of suitable material for the internal liner include paper coated with polymer for polymer films, water-soluble, biodegradable polymer films, which may be constructed of more than one layer. Examples of polymers which are biodegradable include photodegradable polyethylene; corn starch-filled polymers, such as polyethylene and polystyrene; lactic acid based polymers, polylactides, polyglycolide-polylactides; polycaprolactone; polyhydroxybutyrate-valerate; and polyvinyl alcohol. These materials and other materials suitable for the internal liner are well known to those of ordinary skill in the art.

The inner liner does not contain air, as it is highly filled and sealed to be air-tight. Once any air remaining in the inner liner has reacted, no additional air can enter. Furthermore, the binder is protected from any air that might enter by being thickened before setting.

The packaged ready mix is directly introduced into the mixing tanks on site. There is no need to open packages, or decant or dispense from containers. Disposal of packaging materials is not necessary. The packaged ready mix is then mixed with water, and the external packaging and the internal liner are mechanically comminuted, forming a mixture. This mixture is then applied to the soil. Typically 1–5 liters of water, together with 10 to 70 g of thickened soil stabilizer, are applied per square meter.

An advantage of the packaged ready mix of the present invention is that it can be introduced directly into a mixing tank of a vehicle, such as that used in the hydroseeding method of DIN 18 918, without the need to remove or dispose of any packaging. It is unnecessary to measure and mix components.

The thickened soil stabilizer of this invention exhibits the required mechanical stability when packaged in the internal liner of the invention. It was surprising and unexpected that the thickened soil stabilizer of the invention retains it chemical properties in the internal liner. Furthermore, it was unexpected that the thickened soil stabilizer, packaged in the degradable, oil-resistant internal liner, would be stable during transportation and storage.

Obviously, additional modifications and variations of the present invention are possible in light of the above teachings. It is therefore to be understood that within the scope of the appended claims, the invention may be practiced otherwise than as specifically described herein.

German Patent Application 195 10 957.0 filed Mar. 25, 1995, is hereby incorporated by reference.

What is claimed as new and is desired to be secured by Letters: Patent of the United States is:

1. A packaged soil stabilizing composition, comprising:
   (a) a biodegradable external packaging;
   (b) an environmentally degradable internal liner not softened by oil; and
   (c) a concentrated soil stabilizer surrounded by said internal liner;
   wherein said external packaging comprises,
   (i) a first member selected from the group consisting of cellulose, paper and board; and
   (ii) a second member selected from the group consisting of seed, fertilizer, plants, plant parts, organic fibers, mineral substrates, substrates which absorb and store fluid, and pH regulators;
   said internal liner is selected from the group consisting of paper coated with polymer and water-soluble biodegradable polymer films; and
   said concentrated soil stabilizer comprises at least one organic binder and at least one carrier.

2. The packaged soil stabilizing composition of claim 1, wherein said thickened soil stabilizer comprises 1 to 20 parts by weight of said at least one carrier, and 100 parts by weight of said at least one organic binder.

3. The packaged soil stabilizing composition of claim 1, wherein said thickened soil stabilizer comprises liquid polybutadiene oil.

4. The packaged soil stabilizing composition of claim 1, wherein said concentrated soil stabilizer comprises a carrier selected from the group consisting of cellulose, jute fibers, coconut fibers, cotton, wood particles, shredded paper, fur, horn meal, bone particles, straw, organic fertilizers, compost, rock meal, a clay mineral, brick grit, brick dust, demolition material and foamed glass.

5. The packaged soil stabilizing composition of claim 1, wherein said internal liner comprises a member selected from the group consisting of photodegradable polyethylene, corn starch-filled polyethylene, corn starch-filled polystyrene, lactic acid based polymers, polylactides, polyglycolide-polylactides, polycaprolactone, polyhydroxybutyrate-valerate and polyvinyl alcohol.

6. The packaged soil stabilizing composition of claim 1, wherein said internal liner forms an air-tight seal around said concentrated soil stabilizer.

7. A method for treating soil, comprising introducing into a mixing tank a packaged soil stabilizing composition, without removing the packaging;
   mixing, in said mixing tank, said packaged soil stabilizing composition with water, thereby forming a mixture; and
   applying said mixture to soil;
   wherein said packaged soil stabilizing composition comprises:
   (a) a biodegradable external packaging;
   (b) an environmentally degradable internal liner not softened by oil; and
   (c) a concentrated soil stabilizer surrounded by said internal liner;
   wherein said external packaging comprises:
   (i) a first member selected from the group consisting of cellulose, paper and board; and
   (ii) a second member selected from the group consisting of seed, fertilizer, plants, plant parts, organic fibers, mineral substrates, substrates which absorb and store fluid, and pH regulators;
   said internal liner is selected from the group consisting of paper coated with polymer and water-soluble biodegradable polymer films; and
   said concentrated soil stabilizer comprises at least one organic binder and at least one carrier.

8. The method of claim 7, wherein said internal liner comprises a member selected from the group consisting of photodegradable polyethylene, corn starch-filled polyethylene, corn starch-filled polystyrene, lactic acid based polymers, polylactides, polyglycolide-polylactides, polycaprolactone, polyhydroxybutyrate-valerate and polyvinyl alcohol.

9. The method of claim 7, wherein said internal liner forms an air-tight seal around said concentrated soil stabilizer.

10. The method of claim 7, wherein said concentrated soil stabilizer comprises 1 to 20 parts by weight of said at least one carrier, and 100 parts by weight of said at least one organic binder.

11. The method of claim 7, wherein said concentrated soil stabilizer comprises liquid polybutadiene oil.

* * * * *